United States Patent [19]

Sturdevant

[11] Patent Number: 4,523,082

[45] Date of Patent: Jun. 11, 1985

[54] ELECTRODE SHIELD DEVICE

[76] Inventor: Eugene J. Sturdevant, P.O. Box 5327, Wilmington, Del. 19899

[21] Appl. No.: 491,746

[22] Filed: May 5, 1983

[51] Int. Cl.[3] ..................... H01T 19/04; A21B 1/02; F27D 11/12

[52] U.S. Cl. ..................................... 219/399; 165/96; 219/402; 219/404; 361/229; 250/326

[58] Field of Search ............... 219/399, 392, 402, 404, 219/10.81, 391, 394, 395, 396, 397, 398, 403, 280, 281; 165/1, 96; 174/16 R; 361/229, 230; 264/22, 25, 26, 27; 250/324, 325, 326; 422/186.04; 425/174.6, 174.4, 174.8 R, 174.8 E

[56] References Cited

U.S. PATENT DOCUMENTS 3,643,128 2/1972 Testone .............................. 361/230
3,711,710 1/1973 Wright ............................... 250/326
3,716,755 2/1973 Marx .................................. 361/229
3,783,283 1/1974 Smith ................................. 250/325
3,938,345 2/1976 Yamaga ................................ 165/1
4,238,668 12/1980 Mammen ............................. 165/96

*Primary Examiner*—C. L. Albritton
*Assistant Examiner*—Teresa J. Walberg

[57] ABSTRACT

An electrode shield device for use in conjunction with a needle electrode preferably embodied in an oven. The shield device includes a perforated plate and mechanical means supporting the plate for causing relative movement between the plate and the needle electrode. In operation, the mechanical means locating the plate in a spaced relationship to cover the needle electrode for preventing physical contact with the needles when the electrode is electrically inactive and the mechanical means locating the plate in an engaging relationship to expose the needles for permitting the needles to establish current contact with, for example, high potential food.

12 Claims, 4 Drawing Figures

ELECTRODE SHIELD DEVICE

BACKGROUND OF THE INVENTION

1. Field of the Invention

The present invention relates to a needle electrode serving as a corona current generator in an electrical appliance, such as, an oven. More particularly, this invention relates to a shield device for safely storing the needle electrode out of reach by the operator when the needle electrode in the appliance is not in electrical use. The present application is particularly adapted for use in connection with a needle electrode arrangement, such as is disclosed in my copending application entitled Enhanced Heat and Mass Transfer Apparatus, U.S. Ser. No. 488,556, filed Apr. 25, 1983 and having the same assignee. To the extent appropriate to the present invention, the disclosure of the above-identified copending application is incorporated herein by reference.

2. Description of the Prior Art

In the above-identified copending application there are disclosed two needle electrodes embodied in an oven appliance. The two electrodes operate in conjunction with food at high potential in the oven for generating controlled corona current which is applied to surfaces of the food in order to maximize heat and mass transfer so as to minimize cooking time.

While the disclosed apparatus for enhancing heat and mass transfer successfully operates to substantially reduce the cooking time of food, the apparatus and particularly the disclosed needle electrode arrangement used in an appliance poses problems. For example, the upper needle electrode comprises an array of necessarily sharp-pointed needle members that project downwardly towards the food in the oven. The needles are thus exposed in the chamber to present a potential source of injury to the operator's hands when exchanging food in the oven and when attempting to clean the oven walls. Another problem relating to the exposed needles is that they may receive a damaging blow that may bend or even break the needles which may reduce the operating effectiveness of the electrode. A further problem concerns the array of needle members presenting an oven surface which is most difficult to clean and may be regarded as aesthetically not attractive to the operator. Accordingly, there is a need for enabling the use of a needle electrode in an oven appliance yet avoiding the problems presented by the exposed appearance of the needle members when the electrode is electrically inactive.

SUMMARY OF THE INVENTION

To overcome the above-mentioned problems, this application discloses an electrode shield device operable to safely store the needle electrode out of view and out of reach of the operator when the needle electrode is electrically inactive and to permit the needle electrode to establish current contact with the food as disclosed in the above-mentioned copending application. To accomplish this, the present electrode shield device comprises a plate member coupled to the electrode through a disclosed yieldable mechanism including a plunger shaft supporting the plate urged by a compression spring. The plate has a multitude of through holes individually aligned and sized to freely receive a related needle member of the electrode. When the needle electrode is electrically inactive, the yieldable plate is in an extended relationship spaced away from the electrode so as to cover the needle tips to prevent physical contact by the operator. When the needle electrode is made electrically active, the yieldable plate is placed in an engaging relationship abutting against the electrode so as to expose the needle tips for current communication to the food. A skirt member may be provided to cover the front of the electrode so as to completely remove the needle members from view for protection and for aesthetically improving the appearance of the oven chamber. Moreover, when the electrode is electrically inactive, the extended plate provides a substantially smooth surface that may be readily wiped clean. The present electrode shield device is shown and described in connection with the upper movable electrode of the above-identified prior application.

OBJECTS OF THE INVENTION

It is, therefore, an object of the present invention to provide a shield device in a needle electrode appliance that operates to safely store the inactive electrode where possible injury to the operator and damage to the needles are avoided, yet, the device allows the needles to become exposed for current conducting operation when the electrode is activated.

Still another object is to provide a highly reliable, simple and inexpensive to manufacture electrode shielding device.

Other advantages and features of the invention will become evident from the following description and claims taken in conjunction with the appended drawing.

DETAILED DESCRIPTION OF THE PREFERRED EMBODIMENT

Figure 1:
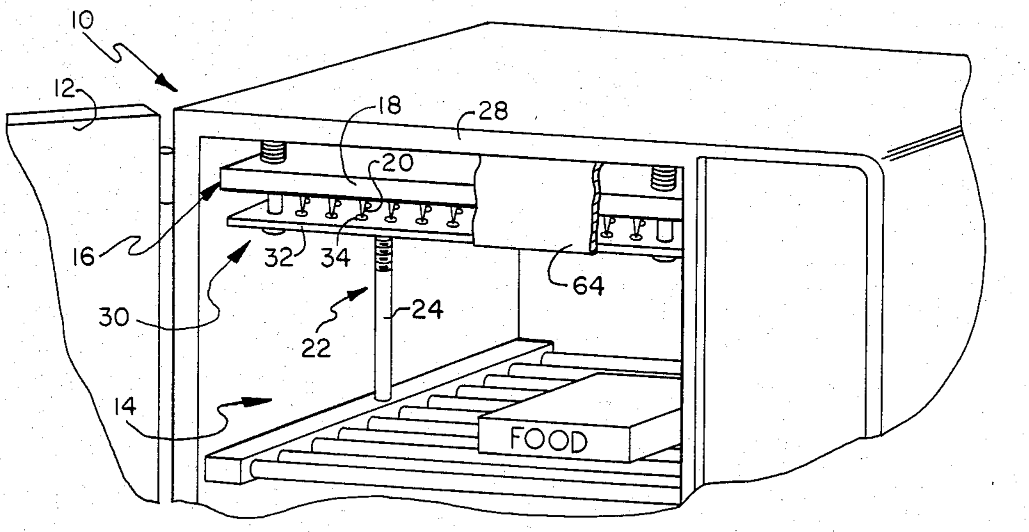
FIG. 1 is a front perspective view showing an electrode shield device built in accordance with the teachings of the present invention and embodied in connection with a movable electrode in an oven appliance.

In FIG. 1 there is shown an upper portion of an oven 10 as viewed from the front with an oven door 12 swung open to expose an oven chamber 14. The preferred oven 10 embodiment is constructed in accordance with the teachings disclosed in the previously mentioned copending application having an upper movable needle electrode 16 comprising a flat base 18 supporting an array of sharply pointed needle members 20 that project downwardly from the base 18 towards the food. Drive means, generally denoted at 22, including a first power scrw 24 and a second power screw 26 (FIGS. 2 and 3) are thread connected to the electrode base 18. Power screw 24, 26 may be rotated by drive means 22 for transmitting vertical drive motion to the electrode 16. The food in oven 10 is regulated at high potential with respect to electrode 16 which is at low potential.

Continuing with reference to FIG. 1, the oven 10 is shown in OFF position locating the movable electrode 16 in an electrically inactive position stationed near a top wall 28 of oven 10. Drive means 22 may be operated to simultaneously rotate the power screws 24 and 26 for causing the needle electrode 16 to move downwardly to establish current contact with the food when oven 10 is switched to ON. The movable electrode 16 may be retracted upwardly to the electrically inactive position when, for example, the door 12 is opened or the oven is switched to OFF. During the food cooking operation, electrode 16 is made to operate (move up and down) above the food for conducting a particular constant current.

The present invention is primarily concerned with avoiding exposure of the operator's hand to the sharply pointed needle members 20 and to protect the needles from being damaged. Accordingly, an electrode shield device, generally denoted by reference numeral 30 is disclosed to operate in conjunction with operation of the needle electrode 16 as is described below.

Figure 2:
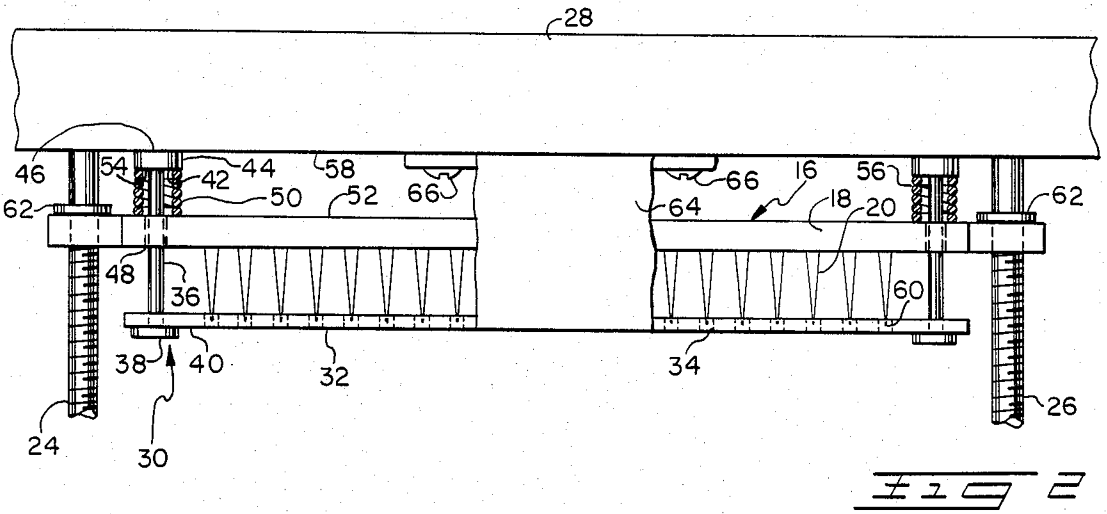
FIG. 2 is a front elevation view of the electrode shield device including a plate in an extended relationship to cover the needle electrode when in an electrically inactive position.

Referring to FIG. 2, there is clearly illustrated the movable electrode 16 stationed at rest in the electrically inactive position located just beneath top wall 28. The present electrode shield device 30 comprises a flat metallic plate 32 having a plurality of through holes 34 at least equal in number to the number of needles 20 and spaced apart for alignment with a related opposing needle member 20. Each through hole 34 is sized so as to permit free passage therethrough of its related needle member 20. A plunger shaft 36 has one end 38 fixedly attached, e.g., riveted, to a corner section 40 of plate 32 outboard the needles 20. The other end 42 of shaft 36 fixedly carries a generally disc shaped abutment 44 having a top surface 46. A through hole 48 is sized to closely receive the shaft 36 wherein the shaft 36 is guided to permit relative free vertical sliding motion. A coiled compression spring 50 is assembled about shaft 36 between a top surface 52 of electrode base 18 and a bottom surface 54 of abutment 44. The spring 50 and shaft 36 combine to function in plunger fashion. A plurality of such plunger arrangements are preferably provided having one located at each corner section of plate 32, such as another one shown at 56, so as to maintain uniform even support of the plate 32.

The operation of th shield device 30 according to the present invention will now be described with reference to FIGS. 2 and 3. The configuration of the component parts of the electrode shield device 30 in the extended position to cover the movable electrode 16 when electrode 16, is in its electrically inactive position is shown in FIG. 2. In this position the top surface 46 of abutment 44 is engaging a bottom surface 58 of top wall 28 under tension from the compression spring 50 which is nearly completely compressed to its closed coil length. The plate 32 is stationed in a spaced relationship to the base 18 of electrode 16. The sharp-pointed tip 60 of all needle members 20 may extend slightly within their aligned through hole 34. The significance of the relationship between the tips 60 resting slightly within holes 34 resides in the fact that plate 32 is sufficiently beneath the needles 20 so as to prevent the operator's finger from coming into contact with the tips 60. Also, a cleaning cloth is prevented from becoming snagged on the tips 60 during wiping action on the plate 32. In the extended position, needle tips 60 may rest slightly above plate 32.

Initially, the movable electrode 16 is powered to move downwardly from the electrically inactive position towards current contact with the food when the food is supplied with high voltage. The plate 32 continues to remain stationary through the upward urging from the compression spring 50 until the electrode base 18 becomes engaged to the plate 32 and, thereafter the shield device 30 is carried to move with the electrode 16 away from top wall 28.

Figure 3:
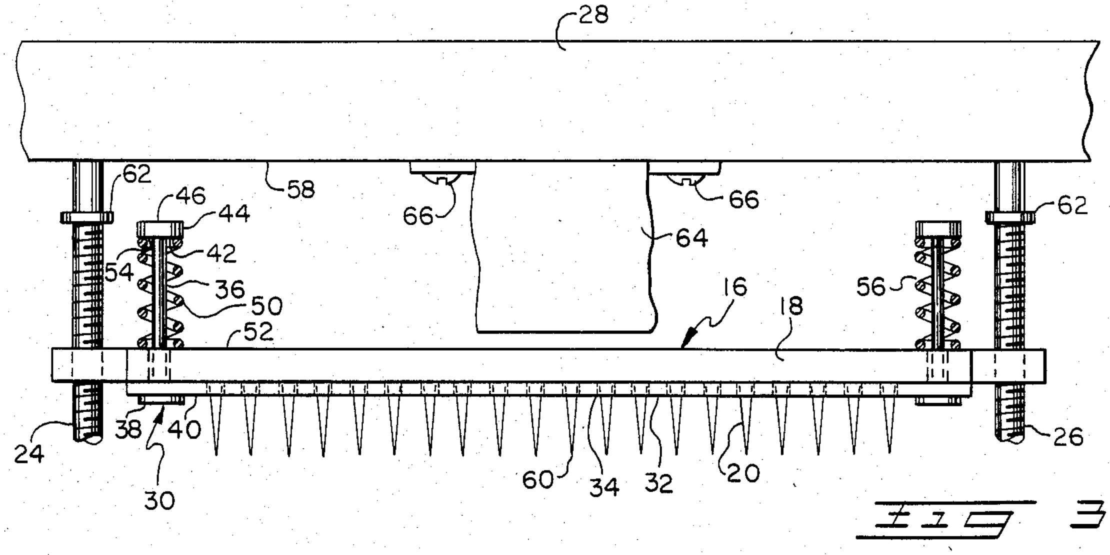
FIG. 3 is a front elevation view of the electrode shield device showing the plate engaging the electrode and the needles exposed for current contact operation.

In FIG. 3 the movable electrode 16 is situated in its current conducting position for generating corona currents applied to food surfaces. The needle members 20 extend from plate 32 through the holes 34 of plate 32 so that tips 60 are exposed to conduct current. Compression spring 50 provides sufficient tension to support the plate 32 in engaging relation to the electrode base 18 when abutment 44 is carried out of engaging relation to the bottom surface 58 of top wall 28.

When the electrode 16 is caused to move upwardly to return to the electrically inactive position of FIG. 2, the shield device 30 is carried upwardly with the electrode 16 until limited by the abutment 44 becoming engaged to the bottom surface 50 of top wall 28. Electrode 16 is allowed to continue to move upwardly while plate 32 remains stationary and the spring 50 becomes compressed. In moving to the electrically inactive position at an upstop member 62, electrode 16 is caused to separate from engagement to the plate 32 after surface 46 engages the internal top surface 58 of top wall 28 and the needle members 20 pass upwardly to withdraw through the holes 34.

A skirt panel 64 is shown in FIGS. 1–3 attached to the top wall 28 by screws 66. Only a central portion of skirt panel 64 is illustrated, however, it is to be understood that the skirt panel 64 may extend along the top of chamber 14 situated towards the front of electrode 16. Skirt panel 64 extends downwardly from the top wall 28, such that, when the electrode 16 is in the electrically inactive position, the skirt panel 64 completely covers the needle members 20 from view by the operator to afford frontal protection to the needles 20 and to aesthetically improve the appearance of the oven chamber 14.

Figure 4:
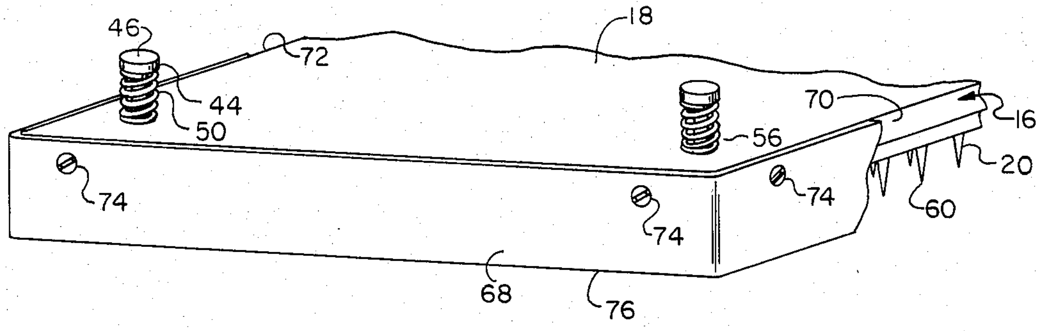
FIG. 4 is a front perspective view showing an alternative embodiment of a front shirt disclosed in connection with the present electrode shield device.

In FIG. 4 there is shown an alternative preferred embodiment of a skirt panel 68. Skirt panel 68 is an elongated one-piece element extending along the front of base 18 of electrode 16 and is formed to extend rearwardly along right and left sides 70 and 72 of base 18. Screws 74 firmly attach the formed skirt 68 to the base 18. Skirt 68 projects downwardly from base 18 to terminate at bottom surface 76 located slightly beneath tips 60 of needles 20. In the embodiment of FIG. 4, the skirt panel 68 is carried to move with the electrode 16 to afford continual frontal protection to the needles 20 when the electrode 16 is electrically inactive and when electrode 16 is moved to the current conducting operating position of FIG. 3.

Through the above disclosed electrode shield device 30 is shown and described in connection with one electrode 16, applicant recognizes that additional needle electrodes employed in the appliance may be provided with a protector shield according to the principles taught herein for safely isolating needles 20 when the electrode is electrically inactive.

It will be understood that various changes in the details and arrangement of components, having been described and illustrated herein, may be made by those skilled in the art within the principle and scope of the invention as defined in the appended claims.

What is claimed is:

1. An electrode shield device for use in conjunction with a needle electrode utilized in a thermal transfer appliance, the needle electrode including a plurality of needles individually having a pointed tip projecting outwardly from a base, and in combination the shield device comprising:

a shield member having a surface area sufficient to cover the plurality of needles; and means for supporting said shield member adjacent the electrode and operable in a first position for rigidly locating said shield member in a spaced relation away from the base to cover the needle tips and in a second position for locating said shield member proximate the base to expose the needle tips from said shield member.

2. A device according to claim 1 wherein said shield member is a flat plate having a plurality of through holes, each one of said plurality of through holes opposing a related one of the plurality of needles and sized to freely receive said related needle.

3. A device according to claim 2 wherein said means supporting said shield member in said first position having the tip of each needle partially extending within a related through hole.

4. A device according to claim 2 wherein the base of the electrode and said flat plate are in parallel relation in a substantially horizontal plane.

5. A device according to claim 1 wherein said means supporting said shield member is yieldable with respect to the electrode.

6. A device according to claim 5 wherein said yieldable support means includes a shaft member extending through an opening in the base, one end of said shaft member supporting said shield member adjacent the needles and spring means connecting said shaft member and the base and located for urging said shield member towards the base.

7. A device according to claim 6 wherein said spring means comprises a coil compression spring.

8. A device according to claim 1 further comprising:

a skirt guard member mounted in the appliance and located towards the front of the electrode to cover the length of the needles.

9. An electrode shield device in an oven appliance having an electrode means, the shield device comprising in combination;

a movable electrode having a plurality of needles projecting from a base;

a drive means coupled to said movable electrode for moving said movable electrode from a first location near an internal top surface of the oven to a second location spacing said movable electrode further away from said internal top surface;

a shield member having a surface area sufficient to cover said plurality of needles; and means carried by said movable electrode for supporting said shield member adjacent said needles and parallel to said base, said means supporting said shield member operative in a first position for rigidly locating said shield member away from said base to prevent physical contact with the needles when said movable electrode is in said first location and in a second position for locating said shield member engaging said base to expose said needles from said shield member when said movable electrode is in said second location.

10. A device according to claim 9 wherein said shield support means includes a shaft member having a first end fixedly attached to said shield member, a second end supporting an abutment and a shaft length portion connecting said first end to said second end, said shaft length portion extending through an opening in said base to permit relative movement between said base and said shield member, and spring means located between said base and said abutment for urging said shield member toward said base.

11. A device according to claim 10 wherein said abutment is urged by said spring means to an engaging relationship to said internal top surface when said movable electrode is operating in said first position, and said abutment is carried out of said engaging relationship to permit said spring means to urge said shield member to engaging relationship to said base when said drive means moves said movable electrode from said first position to said second position.

12. A device according to claim 9 further comprising;

a skirt guard member carried by said base located towards the front of said needles and projecting from the base to cover the length of said needles.

* * * * *